United States Patent [19]
Ells et al.

[11] 4,094,163
[45] June 13, 1978

[54] OFFSHORE STRUCTURE AND METHOD

[75] Inventors: John William Ells, Bexleyheath; Ian David Parker, Basingstoke; David Baird Langley Walker, London, all of England

[73] Assignee: The British Petroleum Company Limited, London, England

[21] Appl. No.: 692,771

[22] Filed: Jun. 4, 1976

[30] Foreign Application Priority Data

Jun. 13, 1975 United Kingdom ............... 25355/75

[51] Int. Cl.² ........................... F16L 1/04; B23Q 3/00
[52] U.S. Cl. ....................................... 61/111; 61/107; 61/110
[58] Field of Search ................... 61/110, 111; 166/0.6; 285/24, 27; 29/464, 237

[56] References Cited

U.S. PATENT DOCUMENTS

| 3,525,226 | 8/1970 | McCarron | 61/111 |
| 3,592,014 | 7/1971 | Brown | 166/0.6 X |
| 3,690,112 | 9/1972 | Pattison et al. | 61/110 |
| 3,724,061 | 4/1973 | Schipper | 61/110 X |
| 3,851,898 | 12/1974 | Ihara | 285/24 |
| 3,910,609 | 10/1975 | Van der Gaag | 285/24 |

Primary Examiner—Dennis L. Taylor
Attorney, Agent, or Firm—Morgan, Finnegan, Pine, Foley & Lee

[57] ABSTRACT

Method of aligning members at an underwater location comprises attaching to one of the members a guide wire anchoring tool and attaching two guidewires thereto so that the latter extend to the surface, attaching to the other of the members a guide tool to engage the guide wires, the guide tool and the anchoring tool having co-operating means to align the members and bringing the members into alignment.

8 Claims, 25 Drawing Figures

OFFSHORE STRUCTURE AND METHOD

This invention relates to a method of aligning and connecting members such as pipes at an underwater location and also to apparatus employed in the method.

It has been previously proposed to join pipes by means of bolts through flanges at the pipe ends. For this to be done the flanges must be accurately aligned prior to being bolted together and must be carefully handled to avoid damage which could prevent a fluid tight joint being made. When this operation has been performed previously underwater, the flanges have been brought into close proximity by means of cables from the surface. However, performance of the operation in deep water e.g. over 200 feet increases the risk of damage to the flanges and a need exists for an improved method of joining flanges underwater.

According to the present invention a method of aligning and connecting two members at an underwater location which method comprises:
 (i) attaching to the first of said members a tool for anchoring guide wires herein referred to as the anchoring tool and anchoring a plurality of guide wires or the like thereto,
 (ii) attaching to the second of said members a guide tool to engage said guide wires, said guide tool and said anchoring tool having co-operating means to align said members,
 (iii) engaging said guide wires with said guide tool and bringing the members into alignment, and
 (iv) removing the anchoring tool and guide tool and joining the members together.

Conveniently at the commencement of the method the first member is located underwater and the second member is above the first member and the method comprises maintaining the first member substantially stationary and lowering the second member and guiding same on said guide wires.

Preferably the co-operating means on the anchoring tool and guide tool comprise co-operating male and female members, e.g. pins and sleeves. The method is convenient when the first and second members are flanges and the first flange is supported free of the water bottom and the flanges are aligned, the anchoring tool and the guide tool removed and the flanges secured together in fluid tight relationship.

The first flange can be protected by a cap prior to the start of the method and the anchoring tool is preferably installed as soon as the cap is removed. Alternatively the anchoring tool can be installed on the first member prior to the latter being set in the water.

Preferably the method comprises maintaining the first flange stationary and lowering the second flange from the surface.

Preferably the first flange is supported on a fixed structure, for example, when the flange is connected to an oil riser, on an offshore platform. When the flange is connected to an oil riser, it is preferred to flood the riser before the start of the method to reduce the hazard to divers.

If necessary, a working platform can be lowered from the surface and located under the first flange, to provide a surface for divers to work on. Preferably the working platform is installed at the commencement of the method.

The anchoring tool can comprise a plate to be installed on the flange to protect same and a means for anchoring the guide wires so that the guide wires are sufficiently spaced from the flange to prevent contact therewith herein referred to as the guide wire locating tool.

Preferably the installing of the plate and the lowering and raising of any other tools or equipment is done by supporting the weight on lifting wires from a fixed structure e.g. platform and employing a plurality of guide wires which are also supported from the fixed structure. Conveniently a winch can be used in the raising and lowering. In a typical arrangement, a pair of guide wires having a lifting wire disposed between them, all three wires running from winches on the fixed structure to three anchor points adjacent the flange can be employed.

Preferably a plurality of support pins are installed in the bottom of the first flange to support the plate.

The plate for the first flange can then be lowered employing the guide wires and the lifting wire until it is resting on the support pins, and can then be attached to the flange, conveniently by means of bolts, preferably after slackening the guide wires. The support pins can then be removed.

After slackening the guide wires, the guide wire locating tool can be removed employing, if necessary, a pulling wire worked by a winch supported on the fixed structure, and the guide wires transfered to the protection plate. The lifting wire is also attached to the protection plte.

The second flange can be connected to a spool piece i.e. a short length of pipeline and can be lowered from the surface e.g. from a vessel. Preferably guide wires are employed for guiding the spool piece during the lowering in which load bearing cables are used. This can conveniently be done by threading the ends of the guide wires through the guide pins on the spool piece whilst at the surface. Preferably the lowering operation is halted when the guide pins on the spool piece are about 3 feet above guide cones on the flange protection plate. At this point a diver can inspect the relative positions of the pipes. It may be necessary to move the vessel e.g. by means of its anchors to correctly align the flanges. The lowering is then continued until the guide pins of the tool on the spool piece are fully home in the cones of the riser flange protection plate.

Preferably one of the flanges, conveniently the second flange is a swivel flange i.e. is able to rotate about the longitudinal axis of the pipe to which it is attached to permit holes in the flange to be brought into alignment with the holes in the other flange.

A swivel flange is a known article familiar to those skilled in the art and forms on part of the present invention.

According to another aspect of the present invention a method of joining two flanges at an underwater location comprises:
 (i) attaching to a first of said flanges a tool for anchoring guide wires herein referred to as the anchoring tool, the anchoring tool having a plate for engaging a flange and means for anchoring a plurality of guide wires in such a manner that the latter are spaced apart from the flange anchoring a plurality of guide wires or the like thereto.
 (ii) attaching to the second of said flanges a guide tool to engage said guidewires said guide tool and said plate having co-operating means to align said members.

(iii) aligning said flanges by means of said co-operating means and removing the anchoring tool and guide tool, and (iv) joining the flanges together in a fluid tight relationship.

Preferably at the start of the method the means for anchoring the guide wires herein referred to as the guide wire locating tool and the plate are separate parts and which comprises attaching to the first flange the guide wire locating tool, anchoring the guide wires thereto and guiding the plate down the guide wires into contact with the first flange and attaching thereto.

Conveniently the method comprises attaching the guide wires to the plates and then removing the guide wire locating tool and then lowering the second flange, having said guide tool thereon and after aligning said members removing the plate and the guide tool prior to connecting the flanges together.

According to another aspect of the present invention there is provided a tool hereafter referred to as a swivel flange guide tool for attachment to a pipe for use in lowering the pipe through water to an underwater location, the tool comprising a framework supporting a plurality of elongate members having longitudinal holes therethrough for guide wires, the framework having a clamping means for clamping the framework to a pipe.

The elongate members are preferably of substantially tubular form (and are hereafter referred to as pins).

Preferably the framework comprises cylindrical members joined together, preferably near their ends. Preferably the axes of the cylindrical members are coplanar and intersect at an angle of 70° to 100°, more preferably 75° to 90°.

Preferably the pins for guide wires are disposed so that their axes are parallel and more preferably substantially at right angles to the plane containing the axes of the cylindrical members. Preferably the pins are attached to the ends of the cylindrical members.

The tool can have a detachable plate for protecting a flange on a pipe end. Preferably the plane of the plate is substantially at right angles to the plane containing the axes of the cylindrical members. The lower portion of the plate is preferably cut away, clear of the lower flange holes.

According to another aspect of the invention a tool for attachment to a flange for providing an anchor point for a plurality of guide wires herein referred to as an anchoring tool) comprises a body having a plate suitable for engaging a flange and means for attachment of one or more guide wires, the arrangement being such that when the tool is attached to the flange the anchor points are disposed so that the guide wires when installed are spaced apart from the flange.

Preferably the plane of the plate is at an angle of 70° to 110°, more preferably about 85° to 95° with the axis of the elongate member (which is preferably of generally cylindrical form) so that when the plate is attached to the underside of a flanged pipe end the elongate body will project from the pipe end approximately horizontally.

The plate can have spigots to enter the holes in the flange.

According to another aspect of the invention a flange protection plate comprises a substantially flat body having a portion suitable for contacting a pipeline flange and one or more tubes to provide guides for guide wires and guide pins.

The axes of the tubes are preferably parallel and the plane containing them preferably parallel to the plane of the flat body. More preferably the two planes are coplanar.

The lower portion of the plate is cut away, clear of the lower flange holes.

Preferably the flat body has an anchor point for lifting cables.

Preferably the ends of the tubes are flared to receive pins.

Preferably the flat body has a plurality of spigots disposed at positions so that they can be brought into register with a plurality of holes in the flange which holes in the plate can receive bolts so that the plate can be bolted to a flange.

According to one aspect of the invention a method of joining together two pipes at an underwater location comprises:

(i) supporting a first pipe having a flange at its end so that the flange is free of the water bottom, the flange having a protection means thereon, (ii) bring a second pipe having a flange at is end into axial alignment with the first pipe and supporting the second pipe in the aligned position, (iii) removing the protection plate from the first flange, and (iv) securing the two flanges together.

Preferably the second flange is a swivel flange and also has a protection plate thereon and the protection plate on the first flange has means for co-operating with corresponding means on the swivel flange protection plate for axially aligning the two flanges.

Preferably the means on the first flange protection plate comprises a plurality of tubular members and the corresponding means on the swivel flange protection plate comprises a plurality of pins, the tubes arranged to receive the pins, the pins having a longitudinal aperture therethrough to receive guide wires.

The invention is illustrated by reference to the accompanying drawings in which

FIG. 1 shows the commencement of the method in which a working platform is lowered to the sea bed and then moved horizontally until it is located under the flanged end of a riser pipe which bears an end cap held by bolts. The bolts are removed and, the cable which was used to lower the working platform attached to an eye on the cap which is then lifted to the surface.

FIG. 2 shows the installation of the guide wire locating tool which is attached to the lower portion of the flange to provide an attachment point for a pair of guide wires. The tool is described in more detail below with reference to FIGS. 11 to 14. FIG. 2 also shows the installation of the guide wires.

FIG. 3 shows the lowering of the guide wire anchoring tool for the riser flange employing the guide wires previously installed.

FIG. 4 shows the final disposition of the guide wire anchoring tool on the flange and removal of bolts holding the guide wires. The guide wire anchoring tool is more fully described below with reference to FIGS. 19 to 22.

FIG. 5 shows the removal of the guide wire locating tool from the lower portion of the flanges and raising it to the surface.

FIG. 6 shows the lowering of the spool piece attached to the second pipe employing guide wires.

FIG. 7 shows the lining up of the two flanges hereafter referred to as the riser flange and the swivel flange and the removal of the protection plate from the swivel flange.

FIG. 8 shows the removal of the guide tool from the swivel flange used for guiding the spool pieces.

FIG. 9 shows the removal of the guide wire anchoring tool and

FIG. 10 shows the drawing together of the two flanges.

The method will now be described in detail.

Figure 1:
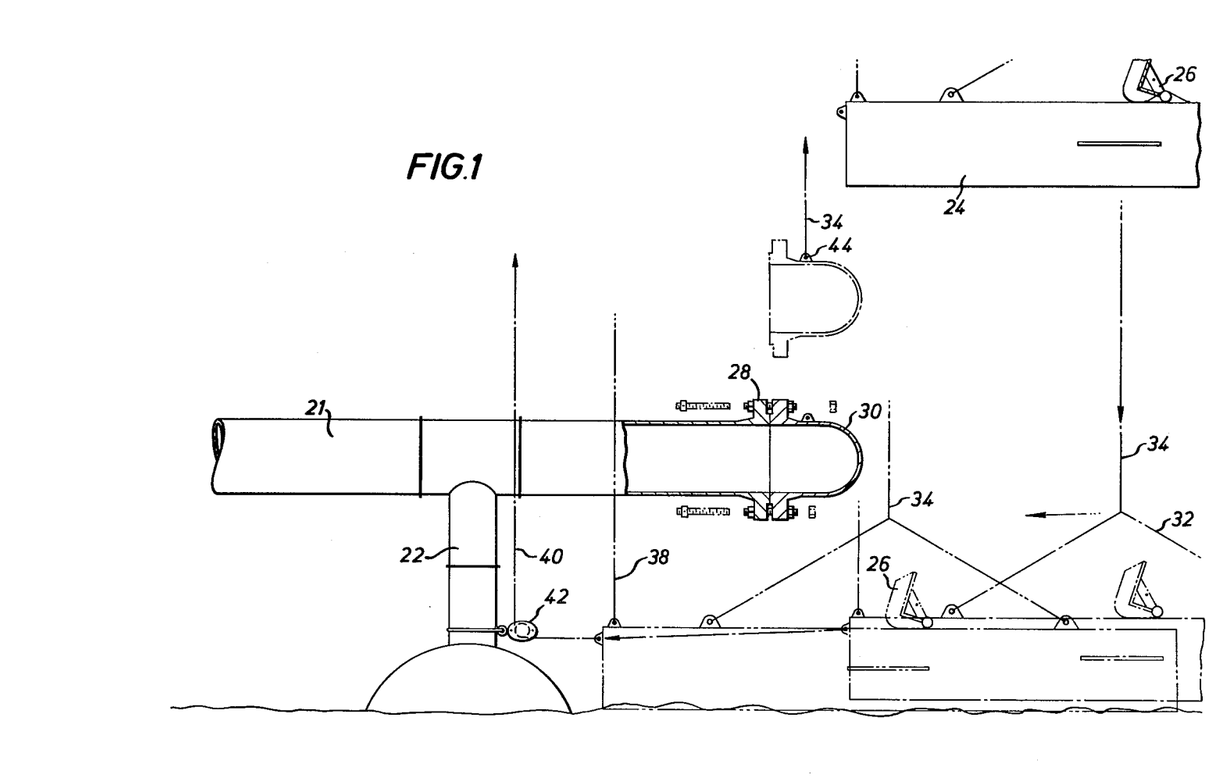
FIGS. 1 to 10 are side elevations showing the various stages in the method.
Figure 2:
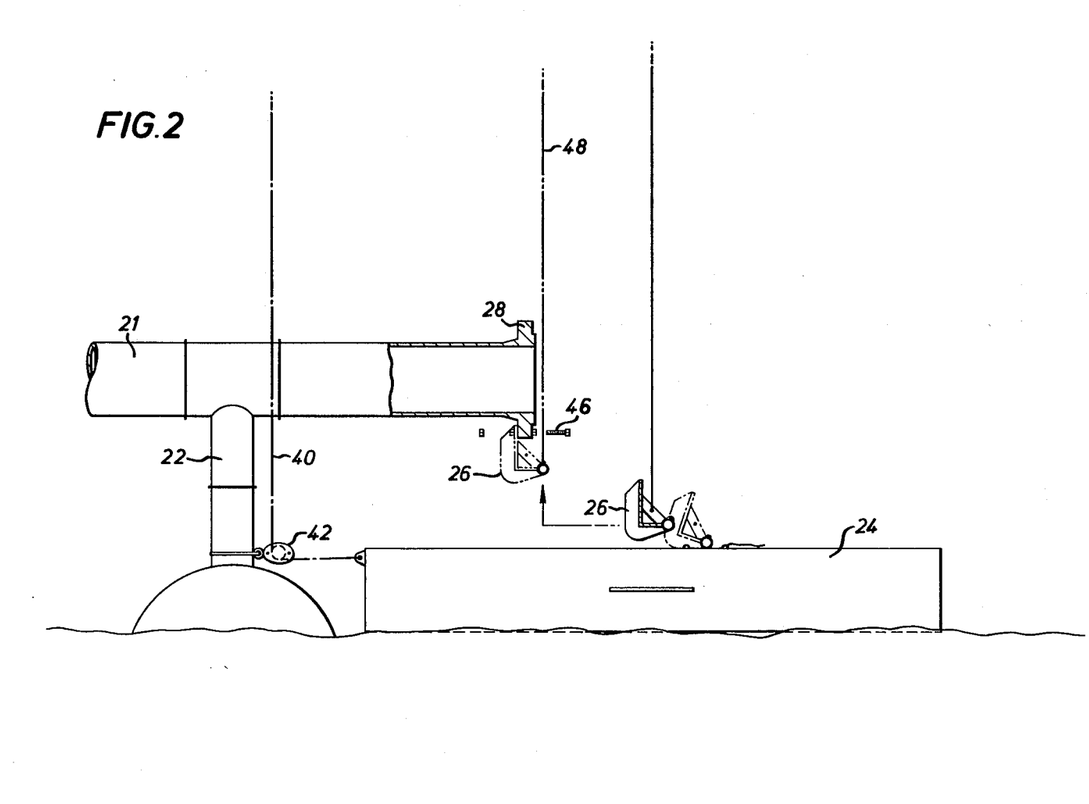

The riser 21 supported on member 22 of an offshore platform is first flooded to mean sea level. A guide wire locating tool 26 is then attached to a working platform 24. Lifting cables 34 and slings 32 and also guide wires 38 and lifting wires 40 are then attached to the working platform 24 and the latter lowered from a barge (not shown) to within a few feet of the water bottom and to about, but not less than, 20 feet of the riser flange 28.

The working platform 24 is then moved sideways into position beneath the riser flange 28 by first threading lifing wire 40 through pulley 42 and attaching to a winch (not shown) and then pulling on the lifting wire 40 to exert a horizontal force on the platform 24. The slings 32 and one of the cables 34 are then detached. The cap 30 is then removed from the riser flange 28 and the cable 34 (removed from the working platform) attached to the pad eye 44 on the flange cap 30 and the latter unbolted and removed to the surface. The guide wire locating tool 26 is then installed on the lower portion of the riser flange 28 and secured by bolts 46. Two guide wires 48 as seen in FIGS. 3 and 4 are then attached to the ends of the tool and tightened.

Figure 3:
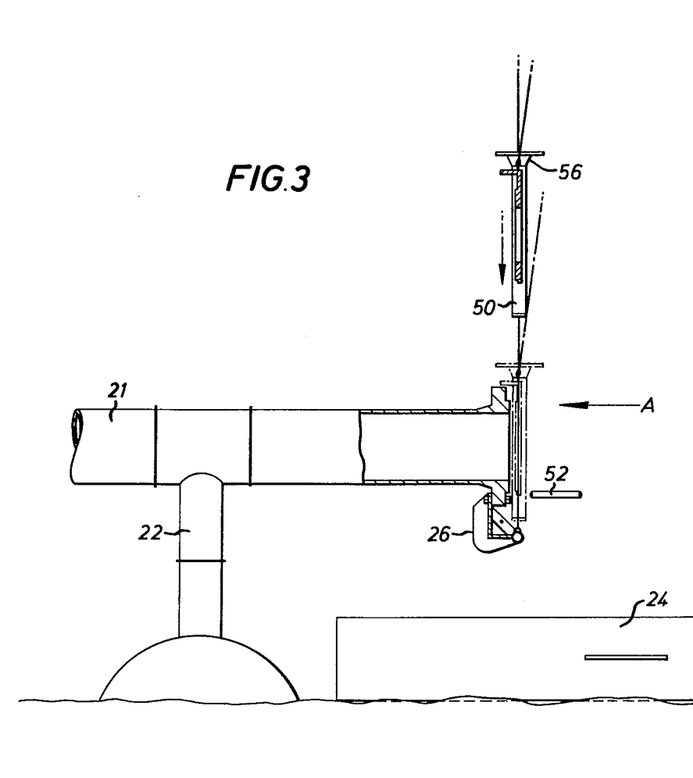
Figure 3A:
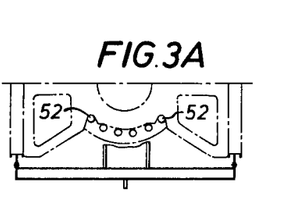
FIG. 3A is an end elevation of the riser flange in the direction A of FIG. 3.
Figure 4:
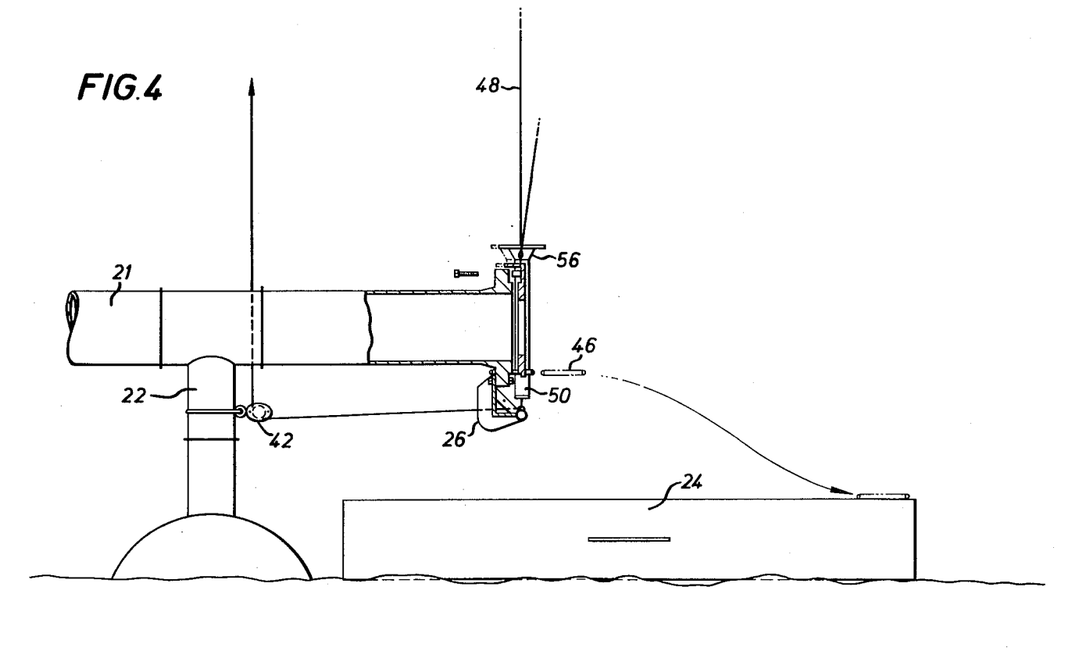

Two support pins 52 as seen in FIGS. 3 and 4 are then installed in the riser flange holes adjacent to the guide tool bolts 46 and anchoring tool 50 is lowered by means of the lifting wire 40 and the guide wires 48 until sitting on the support pins 52 in front of the riser flange 28 and then pulled into contact with the flange 28 using either draw bolts or wire from riser support 22. The guide wires 48 are then slackened and the flange protection plate of anchoring tool 50 is bolted to the riser flange with six bolts, and the support pins 52 removed.

Figure 5:
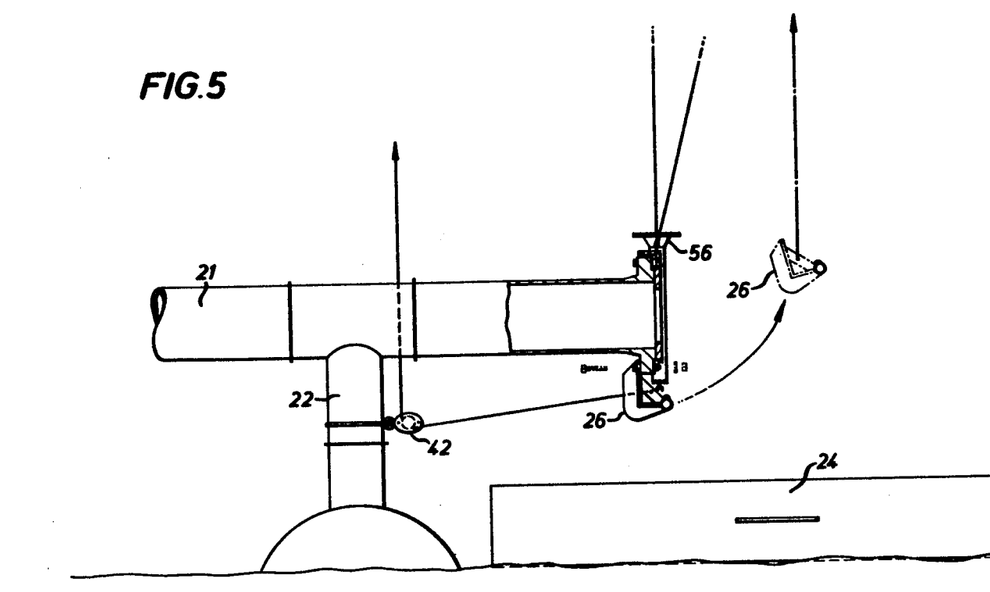
Figure 6:
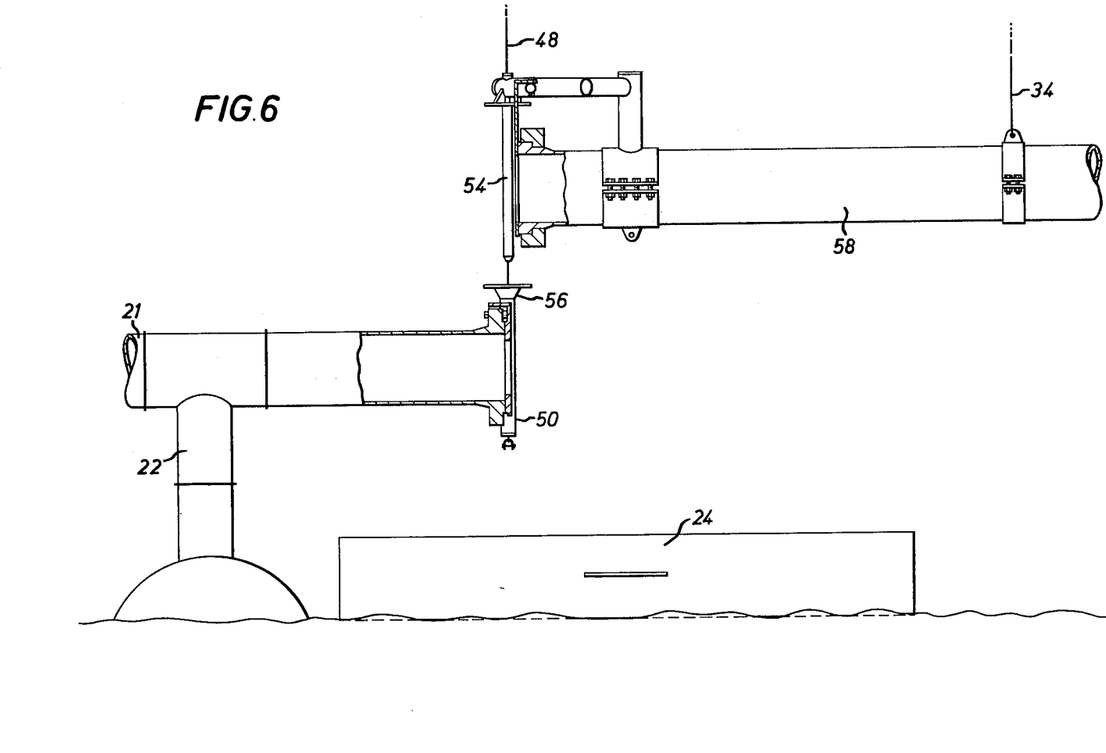

As seen in FIG. 5 guide wires 48 are then transferred from the guide wire locating tool 26 to the guide wire anchoring tool 50 and the lifting wire 40 from the plate 50 to the guide wire locating tool 26. The bolts 46 holding the guide wire locating tool 26 are then removed, and, taking the weight on the lifting wire 40, the guide locating tool 26 is pulled away from the flange 28 using the wire from the riser support 22 and then the guide wire locating tool 26 lifted to the surface. The guide wires 48 as seen in FIG. 6 are then removed from the winch drums (not shown) and threaded through the guide pins 54 on the spool piece and then rewound on the windh drums. Lifting cables 34 are then attached to the spool piece 58 and the latter lowered until the guide pins 54 are approximately 3 feet above the guide cones 56. Then a diver checks whether rotation or translation of the flange is required to provide exact line up of pins 54 and cones 56. The spool piece 58 is then lowered until the guide pins 54 are fully home in the cones 56. The two bolts holding the swivel flange protection plate 58 to the swivel flange 62 on the spool piece 58 are removed and the swivel flange 62 rotated using the lifting wire. The swivel flange 62 is also raised or lowered using the lifting wire or by means of height adjustment bolts on the pins. Four plain pins 60 are inserted through between four holes in both flanges 28 and 62 to maintain line up.

Figure 7:
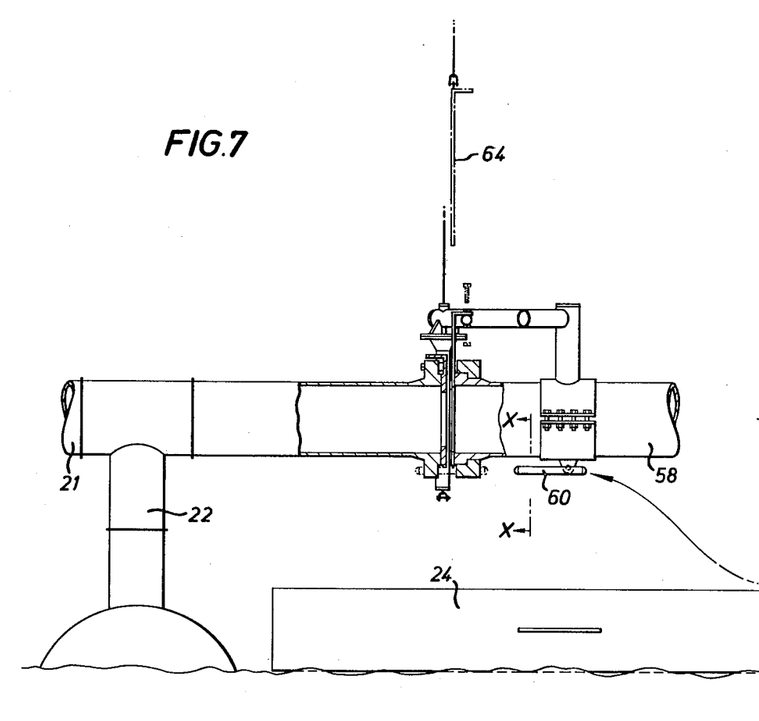
Figure 7A:
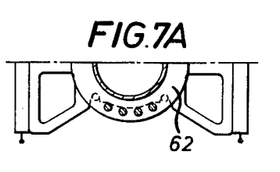
FIG. 7A is a part section along the line X—X of FIG. 7.

Referring to FIG. 7, the lifting wire is attached to the swivel flange protection plate 64 and the two bolts holding the latter to the swivel flange guide pins 54 removed and the protection plate 64 pushed away from the swivel flange 62, and lifted clear of the flange 62 taking care not to scrape the flange and then lifted to the surface.

Figure 8:
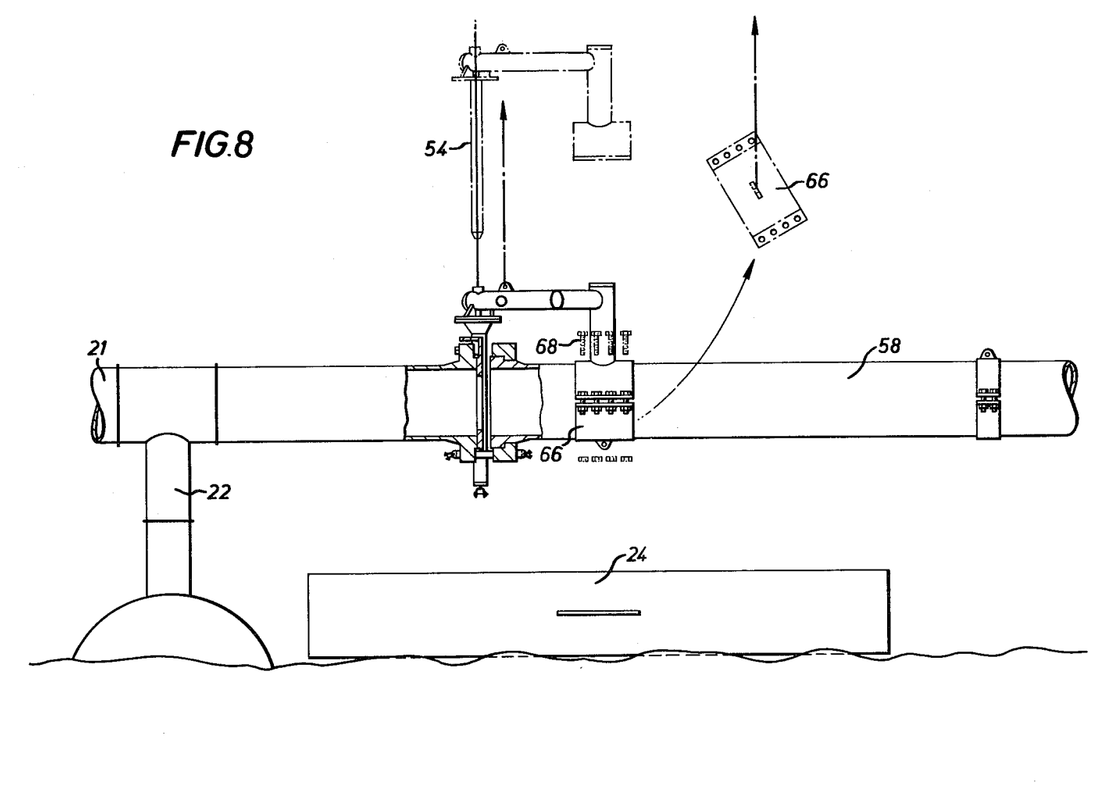
Figure 9:
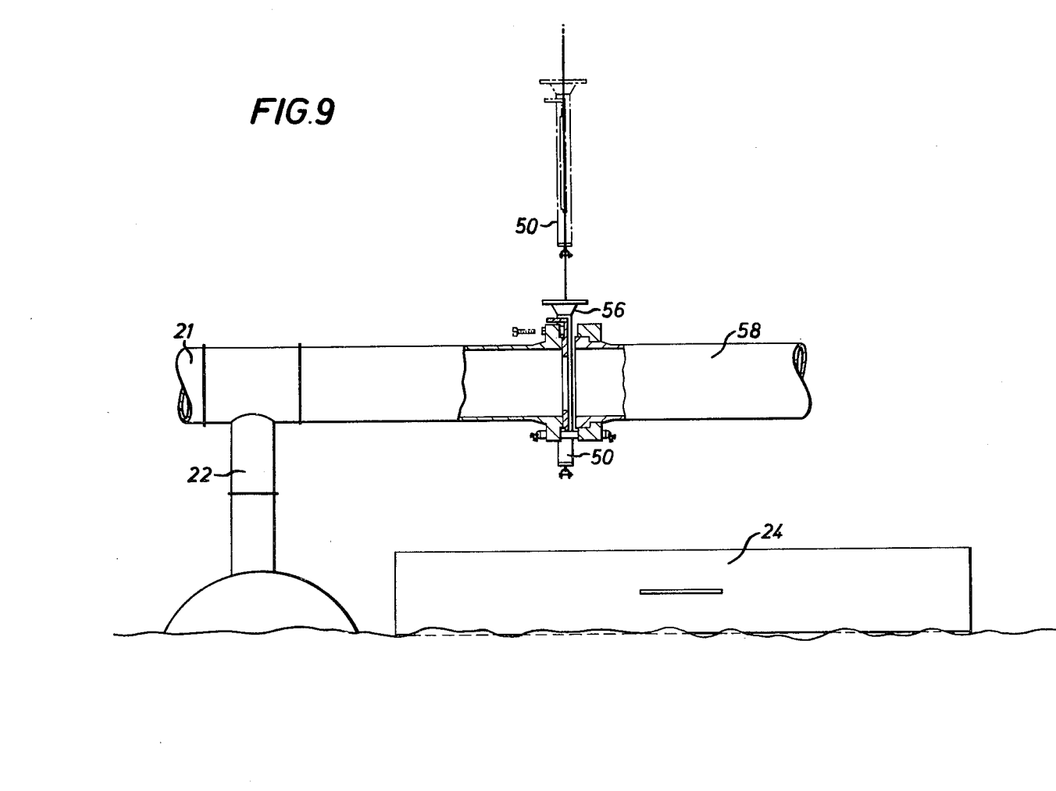
Figure 10:
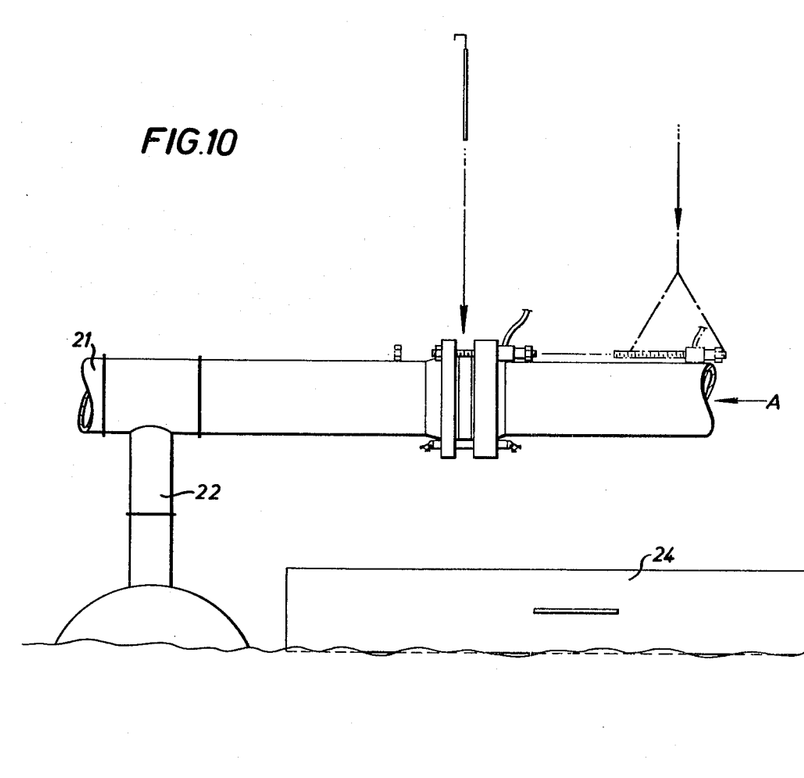
Figure 10A:
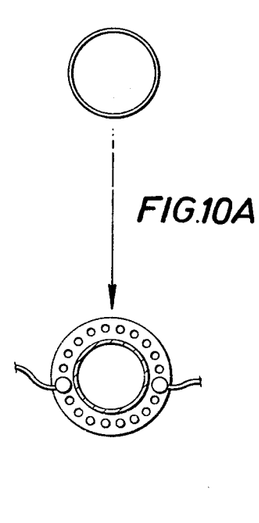
FIG. 10A is an end elevation in the direction A of FIG. 10.
Figure 11:
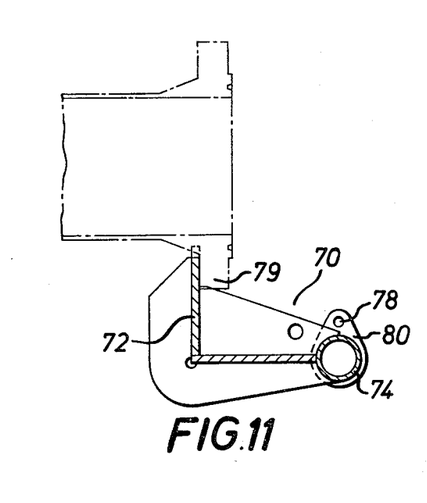
FIG. 11 is a sectional view of a locating tool for providing an anchor point for guide wires (guide wire locating tool) located on the underside of the riser flange taken along the line X—X of FIG. 12.
Figure 12:
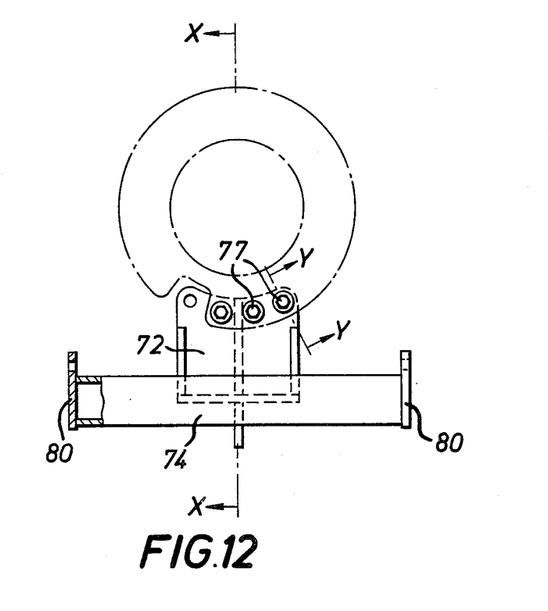
FIG. 12 is an end view of the locating tool.
Figure 13:
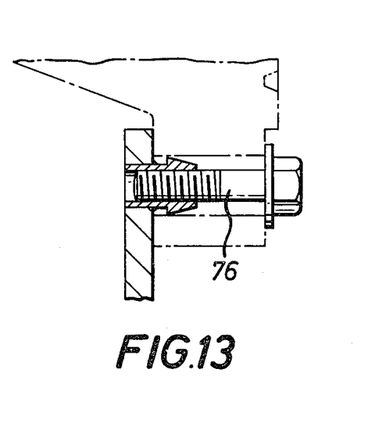
FIG. 13 is a section along the line Y—Y of FIG. 12
Figure 14:
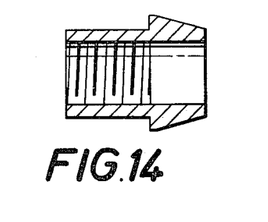
FIG. 14 is a full size longitudinal section of the spigot.
Figure 15:
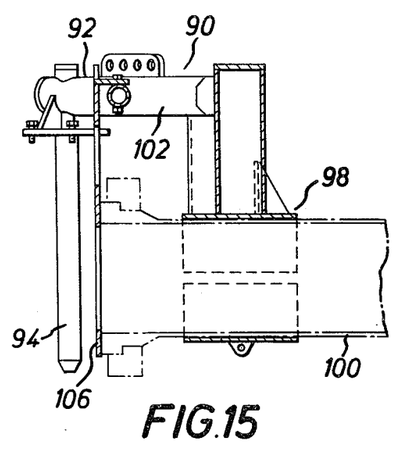
FIG. 15 is a section taken on the line X—X of FIG. 16
Figure 16:
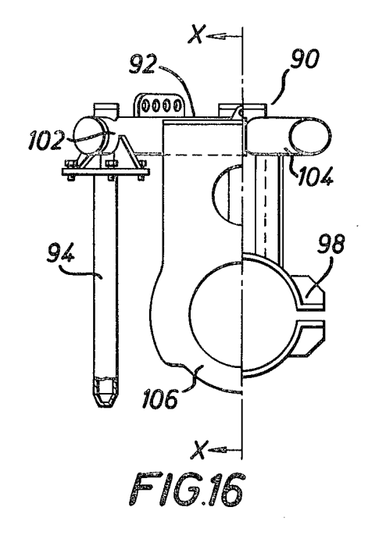
FIG. 16 is a section taken on the line Y—Y of FIG. 18.
Figure 17:
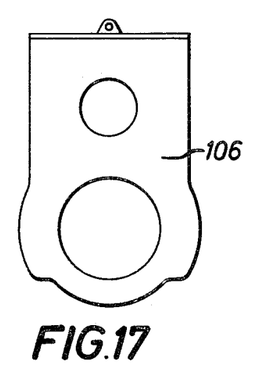
FIG. 17 is an end view of a swivel flange protection plate.
Figure 18:
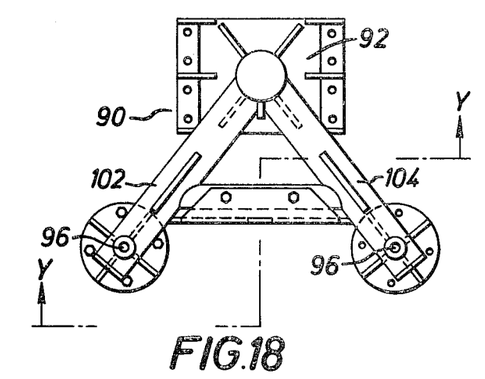
FIG. 18 is a plan view of the swivel flange guide tool for attachment to a pipe for use in lowering the pipe.
Figure 19:
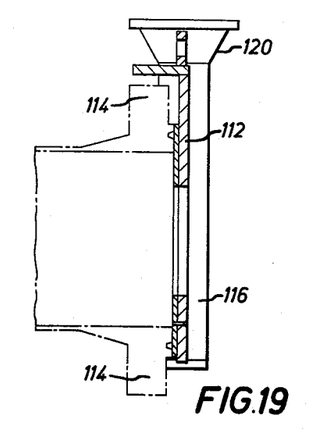
FIG. 19 is a section on the line X—X of FIG. 20
Figure 20:
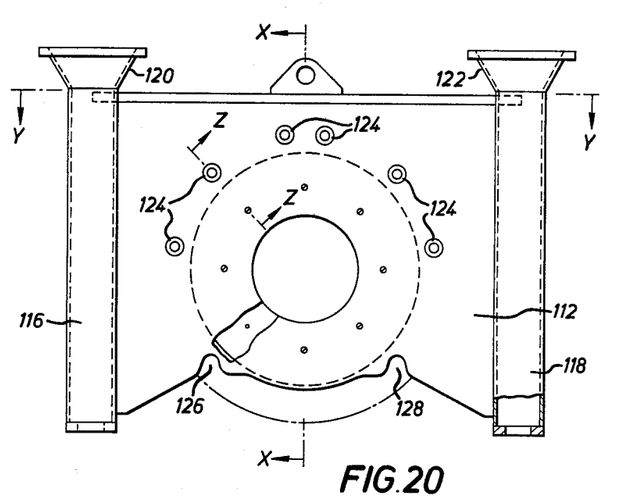
FIG. 20 is an end view of the riser flange protection plate.
Figure 21:
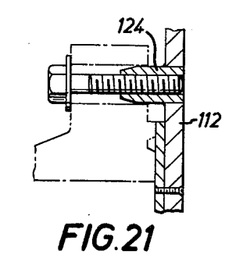
FIG. 21 is a section on the line Z—Z of FIG. 22.
Figure 22:
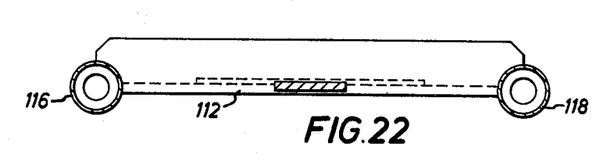
FIG. 22 is a section on the line Y—Y of FIG. 20

As seen in FIG. 8, the lifting wire is then lowered down the line and attached to the lower half 66 of the saddle, bolts 68 removed from the latter which is then lifted to the surface. The lifting wire is then lowered down the line and with a sling attached to two lugs on swivel flange guide pins 54 and the latter lifted out of the guide cones 56 and together with its attachment raised to the surface. Referring to FIGS. 9 and 10, the bolts holding the plate to the riser flange are then removed and the plate then lifted to the surface with guide wires. The flanges are then pulled by means of jacks and secured by bolts.

With reference to FIGS. 11 to 14 the guide wire locating tool indicated generally by 70 has a cylindrical body 74 having a plate 72 which has spigots 76 for engaging holes 77 in flange 79. The tool has means in the form of holes 78 for the attachment of guide wires (not shown) the holes 78 being located in two vertical plate members 80 attached at opposite ends of the body 74.

With reference to FIGS. 15 to 18 the swivel flange guide tool indicated generally by 90 comprises a framework 92 supporting two parallel elongate members in the form of pins 94 each pin having a longitudinal hole 96 therethrough and a clamping the tool to a pipe 100.

The framework 92 comprises two cylindrical members 102 and 104 joined at their ends, their axes intersecting at an angle of about 80°. The tool 90 has a detachable plate 106 whose lower portion is cut away clear of the lower flange holes of a flange.

With reference to FIGS. 19 to 22 the riser flange protection plate indicated generally by 110 has a flat body 112 for contacting a pipeline flange 114 and two tubes 116 and 118 whose axes are parallel to provide guides for guide wires and the guide pins of the swivel flange guide tool. The ends of the tubes 116 and 118 are flared at 120 and 122. The lower portion of the flat body 112 is cut away tobe clear of the lower flange holes and is contoured to provide recesses 126 and 128 to co-operate with pins (not shown) for supporting the plate on the flange 114. The flat body 112 has six spigots 124 engaged in holes in the flange.

We claim:

1. A method of aligning and connecting two pipes at an underwater location, each pipe having a flange at the terminus thereof, wherein at the commencement of the method the first pipe is supported in a stationary position beneath the surface of the water and the second pipe is positioned above the surface of the water, which method comprises:
    (i) attaching an anchoring tool having a substantially flat portion to the flange of said first pipe so that the flat portion of said anchoring tool engages said flange thereby protecting said flange from damage during the connecting procedure, said anchoring tool having means for anchoring a plurality of guide wires at spaced apart locations from said flange;
    (ii) anchoring a plurality of guide wires to the attached anchoring tool;
    (iii) attaching a guide tool to the second of said pipes to engage said guide wires and said anchoring tool, said guide tool and said anchoring tool having cooperating means for aligning said pipes so that engagement of the anchoring tool with the guide tool aligns and axially spaces apart said pipes;
    (iv) lowering said attached guide tool from above the surface of the water along said guide wires into engagement with said anchoring tool so that said pipes are aligned and axially spaced apart prior to being joined together;
    (v) removing the anchoring tool and the guide tool and joining the two pipes together; and
    (vi) fastening the two pipes in a fluid tight relationship.

2. A method as claimed in claim 1 wherein said cooperating means for aligning and spacing apart said pipes comprises a plurality of mutually spaced apart tubular members attached to said anchoring tool and a plurality of mutually parallel pins attached to said guide tool and positioned for engaging said tubular members, each of said pins having a longitudinal aperature therethrough for receiving a guide wire.

3. A method as claimed in claim 1 wherein said guide tool includes a releasable clamping means for clamping said second pipe and a plate for protecting the flange of said second pipe.

4. A method as claimed in claim 1 wherein the attachment of the guide wire anchoring tool is effected by:
    attaching a guide wire locating tool to the flange of said first pipe and connecting guide wires thereto;
    lowering the guide wire anchoring tool from the surface along the guide wires;
    attaching the guide wire anchoring tool to the flange of said first pipe and anchoring the guide wires thereto; and
    removing the guide wire locating tool.

5. A method as claimed in claim 1 wherein the co-operating means on the anchoring tool and guide tool comprise co-operating male and female members.

6. A method as claimed in claim 1 wherein the anchoring tool on the first pipe prevents the guide wires from contacting the first pipe and the guide tool prevents the guide wires from contacting the second pipe.

7. A method as claimed in claim 1 wherein the first pipe is a riser connected to an oil or gas production facility and the second pipe is a spool piece.

8. A method as claimed in claim 1 wherein one of the flanges is a swivel flange.

* * * * *

UNITED STATES PATENT OFFICE
CERTIFICATE OF CORRECTION

Patent No. 4,094,163    Dated June 13, 1978

Inventor(s) John William Ells et al

It is certified that error appears in the above-identified patent and that said Letters Patent are hereby corrected as shown below:

Col. 2, line 30, delete "plte" and insert -- plate -- in place thereof.
Col. 4, line 22, delete "is" and insert -- its -- in place thereof.
Col. 5, line 57, delete "FIGS. 3 and 4" and insert -- FIG. 2 -- in place thereof.
Col. 6, line 3, after "40" add -- is transferred -- .
Col. 6, line 3, delete "plate" and insert -- anchoring tool -- in place thereof.
Col. 6, line 13, delete "windh" and insert -- winch -- in place thereof.
Col. 6, line 43, delete "riser flange" and insert -- guide wire anchoring tool 50 -- in place thereof.
Col. 7, line 4, delete "tobe" and insert -- to be -- in place thereof.

Signed and Sealed this

Twenty-first Day of November 1978

[SEAL]

Attest:

RUTH C. MASON
Attesting Officer

DONALD W. BANNER
Commissioner of Patents and Trademarks